Aug. 4, 1953                T. W. ZOBEL ET AL                2,647,434
                    INTERFEROMETER USING LIQUID MIRRORS
Filed July 25, 1950                                    3 Sheets-Sheet 1
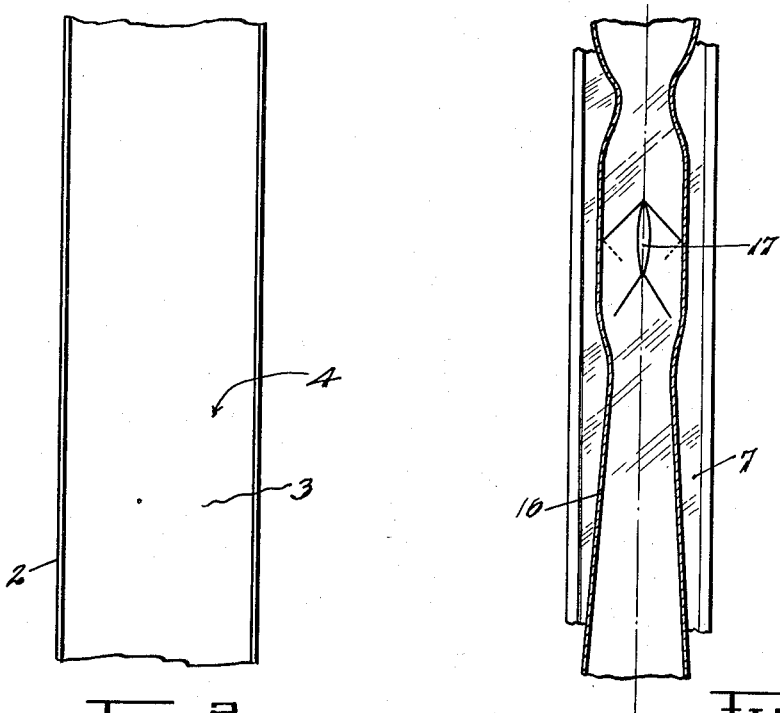
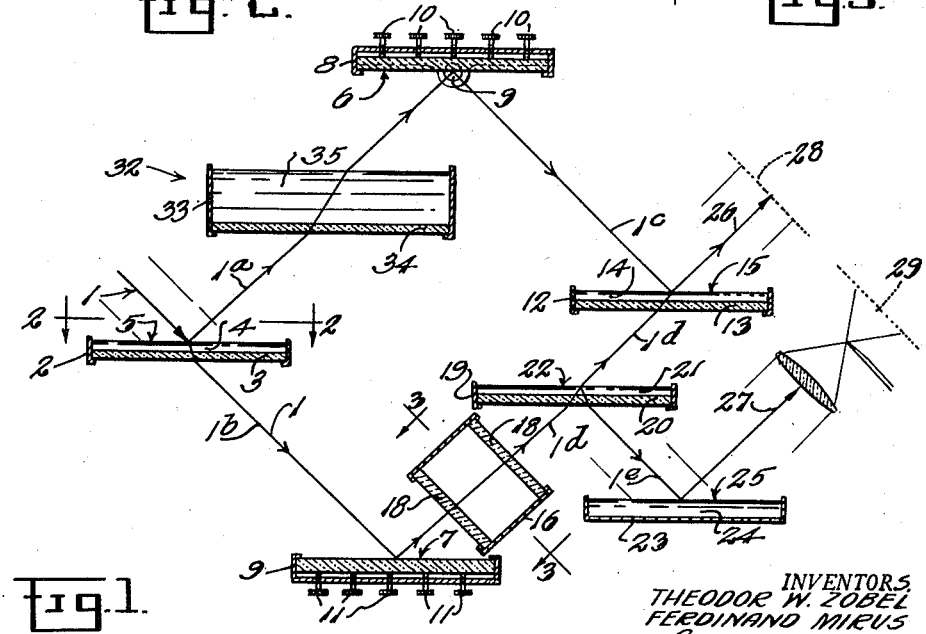

Aug. 4, 1953 T. W. ZOBEL ET AL 2,647,434
INTERFEROMETER USING LIQUID MIRRORS
Filed July 25, 1950 3 Sheets-Sheet 2

INVENTORS.
THEODOR W. ZOBEL
FERDINAND MIRUS

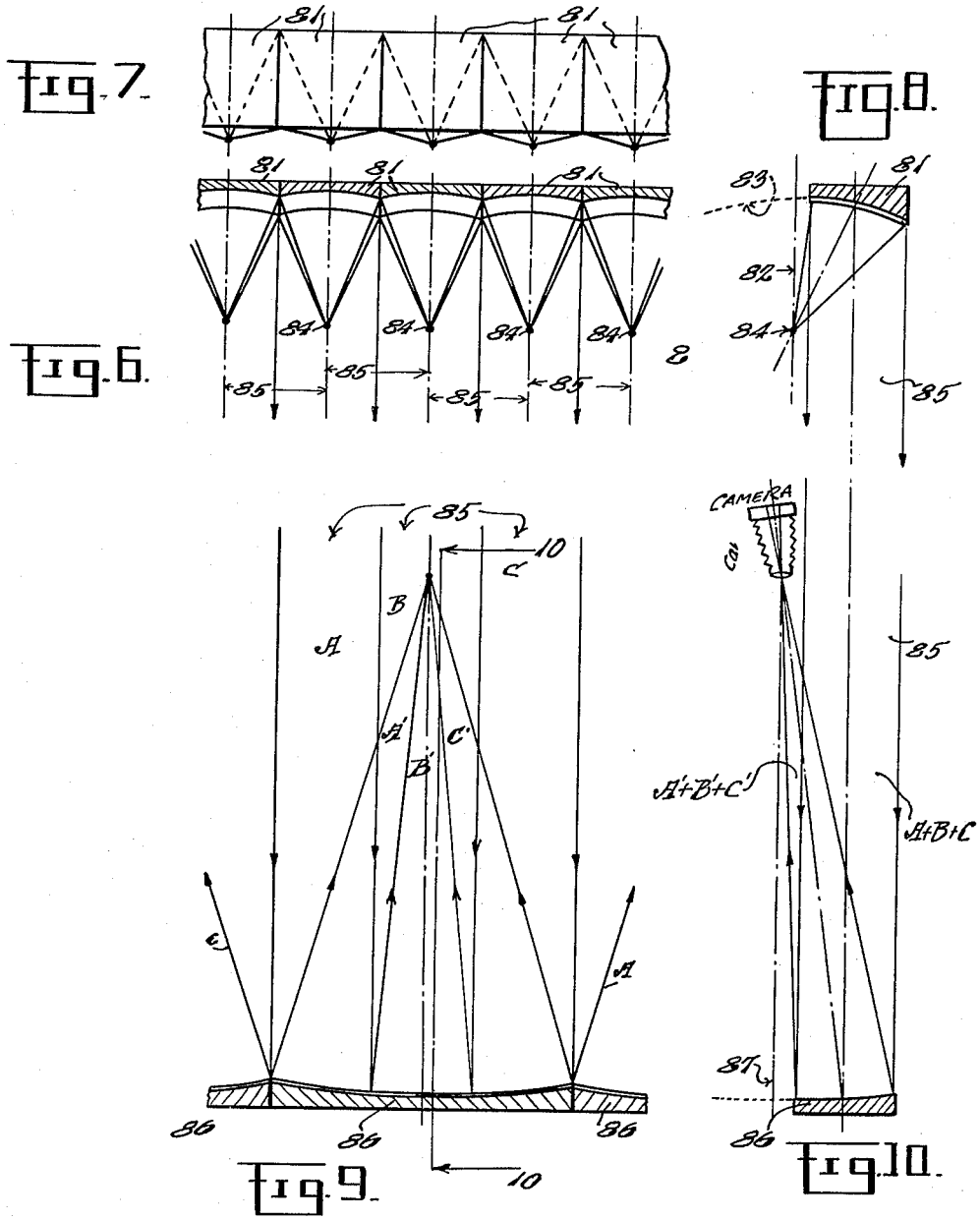

Patented Aug. 4, 1953

2,647,434

UNITED STATES PATENT OFFICE 2,647,434

INTERFEROMETER USING LIQUID MIRRORS

Theodor W. Zobel, Braunschweig, and Ferdinand Mirus, Weiner, Germany

Application July 25, 1950, Serial No. 175,845

10 Claims. (Cl. 88—14)

(Granted under Title 35, U. S. Code (1952), sec. 266)

The invention described herein may be manufactured and used by or for the Government for governmental purposes without payment to us of any royalty thereon.

This invention relates to interferometer apparatus and more particularly to an optical arrangement utilizing liquid reflecting surfaces to produce a satisfactory interferometer apparatus capable of covering large areas.

The criterion of the optical quality of an interferometer apparatus is determined by the quality of the final interference path which is produced by the apparatus when all of the used optical parts are assembled and functioning together. Since it is known that the quality of the surfaces of transparent plates for transmitting light therethrough can be lower than those required for the reflected light, the most important and sensitive surfaces within an interferometer apparatus are the reflecting surfaces. For example, in a conventional interference apparatus such as the four-plate system of the Mach-Zehnder type, the most important surfaces are the respective reflecting surfaces of the semi-transparent beam splitting and combining mirrors or plates, and the reflecting surfaces of the full mirrors for reflecting the split in diverging collimated partial light beams toward each other. The rear surfaces of the semi-transparent plates can be less accurately "figured" then the front reflecting surfaces because these rear surfaces are used only for the transmitted light which passes through the plates.

Since the requirements for light interference apparatus for more precise and accurate measurements in larger sizes are increasing in many fields of research work, the obtainable accuracy of the reflecting surfaces must also be increased. In other words, increasing the size of the reflector plates and mirror surfaces when finished by grinding and polishing can and does increase the difficulties in obtaining equally accurate apparatus, and the cost of such optical parts is increased to an extreme amount when extremely high accuracy is required, especially in interferometer apparatus of very large sizes.

It is assumed, for instance, that the displacement of the interference fringes of a ¼ wave length in the final interference pattern is the limit allowed. This is not the highest required accuracy of an interference apparatus but is only an example for explaining the problem involved when larger size reflecting surfaces are made. If it is assumed that this final influence of ¼ wave length in the interference pattern is the result of all four of the optical reflector plates and each of the four surfaces of the four-plate interference system would produce the same influence, each surface must be accurate within 1/16 of a wave length of the light that is used. It can thus be easily understood how the difficulties increase when increased size interference apparatus are built.

If, for instance, an interference apparatus is designed with a four times larger covering linear dimension, then the area of the field will be 16 times greater. If the same accuracy of the reflecting surfaces must be obtained, or in other words, if the radius of the curvature of the reflector plates and the mirrors should remain the same, the number of interference fringes visible in these surfaces would increase with the square of the linear enlargement. The displacement of the final interference fringes in an interference picture which was ¼ fringe width in the smaller plates would now be four full fringe widths. Since ¼ fringe width was the maximum limit allowed in this example, all the reflecting surfaces must now be improved by grinding and polishing to this finally required ¼ wave length accuracy, which means that accuracy of the larger plates of the example must be 16 times higher than the accuracy of the smaller plates or, in other words, each large plate reflecting surface must be limited to a 1/16 wave length over the increased coverage field, which corresponds to only a 1/256 wave length variation in the original small size plate. Of course such reflector plates and mirrors would probably cost hundreds of thousands of dollars to make, if their production was possible at all and require a long time to complete.

For this reason, as set forth in another patent application, U. S. Patent 2,555,387 to Theodor W. Zobel, patented June 5, 1951 the proposal of deforming the reflecting surfaces an interference apparatus in order to obtain optical corrections of the highest possible grade is a remarkable progress in the art of interferometry. The deformation of the reflecting surfaces however, is only a partial solution to the building of precision interferometers, and combined interference and Schlieren apparatus having large sizes, while permitting the use of optical parts of much lower cost, and probably would reduce the expense in obtaining high quality opaque reflector plates in the larger sizes, also this deformation of the reflectors is controllable for obtaining good accuracy at medium cost, also providing means to compensate for astigmatism effects in cases where concave mirrors must be used with their axes in a position oblique to the light beam, as for instance, within a Z-shaped Schlieren interferometer arrangement. A special concave opaque mirror can be deformed to a parabolic one, or to a part of such a curvature, or a parabolic concave mirror can be corrected to about the exact mathematical shape as required by adjusting or distorting the reflecting surface.

In spite of the fact that the deformating principle as disclosed in Patent 2,555,387 promises to be satisfactory for obtaining compensating effects in the two light beams of interferometers which never could be obtained by grinding or polishing alone, only the opaque reflecting mirrors of the interferometer apparatus can be deformed since the deforming means would be in the path of the light beams, leaving the semi- or partially transparent reflecting surfaces of the mirrors for splitting the interferometer beam and for recombining the same after it has passed through the test medium undisturbed and therefore any inaccuracies and curvatures in their reflecting surfaces cannot be compensated for by deformation of these surfaces. The weight of these reflector plates curves the surfaces, and therefore the accuracy of the most perfectly ground plane surfaces depends upon the position of these plates when in use in the interferometer apparatus and can only be ground to approach an optically flat surface.

Since it is always desirable to obtain the highest possible degree of flatness at the lowest possible cost, any curvature of the reflecting surfaces can be chosen preferably in such a way that the positions of the surfaces cause the surfaces to be flatter when in their working or operative position. However, the possibility of obtaining an optically flat surface for the partially transparent reflector plate, and the accurate determination of this curvature, is still a real problem since an absolute flatness of the surfaces cannot be obtained, but only an approximation thereof and the deformation means must be used additionally to correct errors in the reflecting surfaces of the opaque reflector plates.

In the present invention the reflecting surfaces of the semi-transparent mirrors of an interometer apparatus and in some instances the opaque mirrors, are replaced by liquids having opaque or partially transparent liquid reflecting surfaces. These liquids produce an absolutely flat surface which is horizontal, with all of the surfaces inherently parallel, also the size, shape, and extent of the liquid reflecting surfaces are not materially limited. The apparatus is extremely valuable when used with elongated testing mediums such as in a portion of an elongated wind tunnel since the length of the transparent receptacle and its semi-transparent liquid reflecting surface is not limited.

In this connection an improved arrangement of illuminating elements is provided illuminating the elongated wind tunnel test section comprising a plurality of concentrated light sources disposed in a row at one side of the test medium with a corresponding row of parabolic reflectors with a rectangular outline disposed in side-by-side juxtaposed relation for producing a relative wide beam of collimated light which is projected through the test medium. At the other side of the test medium a plurality of elongated side-by-side rectangular parabolic mirrors are disposed in a row with their focal axes disposed parallel to the collimated beam through the test section, but offset to one side thereof. For instance, one row or group of these elongated parabolic reflectors may be disposed at the light exit side of the test medium, one of the elongated reflectors receiving the collimated beams from three of the square parabolic reflectors at the opposite side of the test medium. The use of this improved lighting arrangement with the elongated liquid reflectors produces an ideal combination since the liquid reflecting surfaces are not limited in length and all of the liquid reflecting surfaces are inherently parallel to each other. The side-by-side collimated light input beams which leave the rectangular concave reflecting surface can be inclined downwardly onto the first beam splitting liquid reflecting surface to form a wide collimated light beam while the other group of elongated rectangular parabolic reflecting surfaces can also be disposed in a row to each receive a portion of the recombined beams, for producing the light wave fringes and Schlieren images.

Referring to the drawings, in which like reference characters refer to like parts in the several figures;

Fig. 1 is a vertical sectional view diagrammatically disclosing a four-plate interferometer apparatus of the Mach-Zehnder general type having a secondary beam splitting plate for obtaining the Schlieren image. The opaque mirrors in this figure are disclosed as glass reflecting plates having adjusting means for deforming the plates in order to obtain final optical corrections;

Fig. 2 is a horizontal sectional view taken through the apparatus in the plane indicated by line 2—2 in Fig. 1 and disclosing one of the transparent bottom receptacles for receiving a transparent liquid therein having a semi-transparent liquid reflecting surface;

Fig. 3 is a longitudinal sectional view taken on the plane indicated by line 3—3 in Fig. 1, disclosing a wind tunnel section having a test object therein surrounded by a testing medium;

Fig. 6 is a fragmentary horizontal sectional view of an improved illuminating system which is especially adaptable for use in connection with liquid reflecting surface interferometer apparatus;

Fig. 7 is the end view of the structure shown in Fig. 6;

Fig. 8 is a vertical sectional view taken about in a vertical plane through the center of one of the lens elements 81 in Fig. 6.

Fig. 9 is a fragmentary horizontal sectional view of the light exit portion for receiving collimated beams from the reflectors shown in Fig. 6 after the passage of the wide test beam through the test medium; and Fig. 10 is a vertical sectional view taken approximately on the plane indicated by line 10—10 in Fig. 9.

Figure 4:
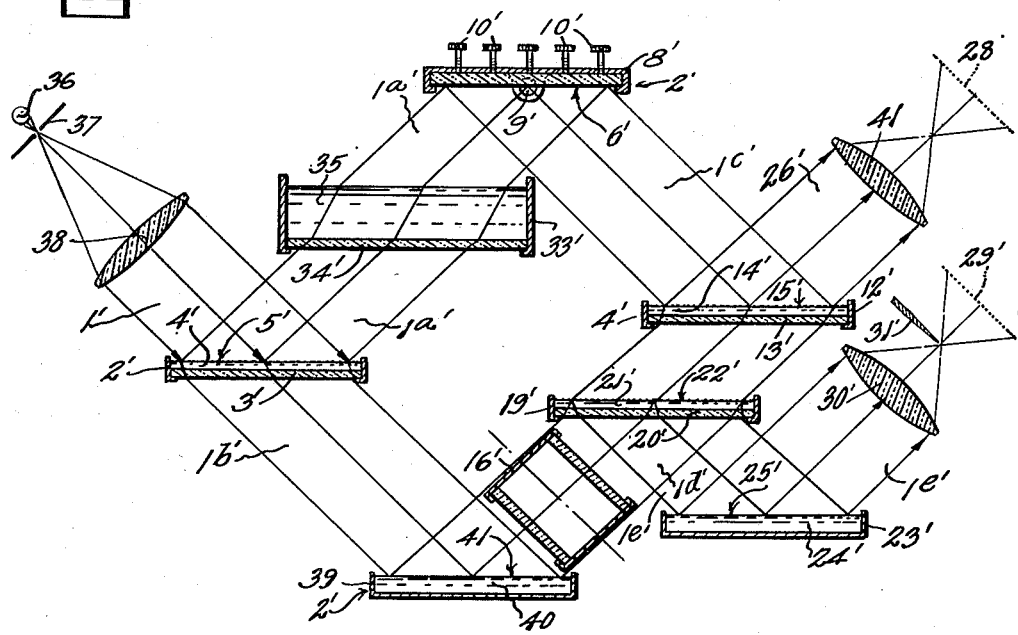
Fig. 4 is a vertical sectional view diagrammatically disclosing a four plate interferometer system similar to Fig. 1 in which the lower opaque reflecting plate or means is formed by a liquid having an upper opaque reflecting surface.

Referring more particularly to Fig. 1 of the drawings the reference numeral 1 indicates diagrammatically a beam of collimated light originating from any suitable light source such as an optical slit having a concentrated light in the rear thereof in which collimating lens means is provided for directing an enlarged beam of parallel light rays downwardly in a predetermined inclined or oblique direction. For instance the inclined collimated beam 1 may be produced by the plural light source optical system illustrated in Fig. 6, in which collimated light beams are reflected by the side-by-side rectangular parabolic portions of mirrors to produce a wide oblique beam of collimated light, indicated at 1 in Fig. 1. Located in the path of the inclined collimated beam 1 is a liquid receptacle 2 having a transparent bottom 3, of suitable material such as a glass plate. The liquid receptacle 2 is disposed horizontally and contains a transparent liquid 4 having a partially transparent liquid reflecting surface 5 for splitting the collimated beam 1 into two diverging collimated partial beams 1a and 1b disposed in the same vertical plane.

Opaque reflector plates 6 and 7 are disposed respectively in the paths of the diverging beams 1a and 1b for reflecting the same towards each other as indicated at 1c and 1d. The opaque reflectors in this figure comprise optically flat glass opaque mirrors mounted in supporting frames 8 and 9, each frame having a plurality of adjusting or deforming means 10 and 11 in the form of adjusting screws for deforming the reflecting surfaces to correct minor errors or curvatures that might be found in the flat reflecting surfaces.

The supporting frame 8 is preferably pivoted at 9 and adjustable to reflect the collimated partial beam 1c across the reflected collimated partial beam 1d in the vertical plane as shown in the drawings. A partially transparent recombining reflector 12 is interposed across the converging beams 1c and 1d and comprises a liquid receptacle or container having a transparent plate supporting bottom 13 disposed horizontally and contains a transparent liquid 14 having a partially transparent liquid reflecting surface 15. The partially transparent reflecting surface 15 reflects a portion of the partial light beam 1c in combined relation with the portion of the converging light beam 1d which passes through the liquid and the partially transparent liquid reflecting surface 15.

A test chamber or wind tunnel section 16 is interposed in the test beam 1d and is adapted to contain a testing medium and the object to be tested, such as indicated at 17 in Fig. 3. Horizontally disposed between the spaced parallel transparent side walls 18—18 of the test chamber 16 and the liquid receptacle 12 is a receptacle 19 having a transparent bottom 20, and containing a transparent liquid 21 having a partial transparent liquid reflecting surface 22 for reflecting a portion of the beam 1d from the reflecting surface 22 to form a Schlieren beam indicated at 1e.

An elongated horizontal receptacle 23 contains a liquid 24 having an opaque liquid reflecting surface 25 disposed in the path of the Schlieren beam 1e for reflecting the same in spaced parallel relation to the recombined portions of the converging partial light beams 1c and 1d and is indicated as the recombined interference beam 26. The Schlieren beam is indicated at 27, suitable image screen means 28 being provided in the path of the interference beam 26 for receiving the interference fringes thereon. A similar image screen 29 is disposed in the Schlieren beam 27, conventional lens and Schlieren knife edge means being arranged in the beam 27 to produce the Schlieren image on the screen 29. A compensator is disposed in the path of the reflected partial beam 1a at 32 and comprises a receptacle 33 having a transparent plate bottom 34, a suitable refracting liquid 35 being disposed therein, the depth of the liquid 35 and the selection of its refraction index providing means for compensation for the passage of the divided light beam 1b through the transparent side walls 18 and 18 of the test chamber and the testing medium contained therein. In the apparatus illustrated in Fig. 1 it should be observed that the most important liquid reflecting surfaces are the reflecting surfaces 5 and 15 of the beam splitting reflectors and these surfaces are formed by liquids and are therefore always flat and level. The Schlieren beam splitting plate 19 is also formed by a reflecting liquid so that these liquid reflecting surfaces are always parallel to each other and lie inherently "flat." The opaque reflector 8 is adjustable around its pivot 9 to bring the two partial beams in desired phase relation. The adjusting means 10 for the opaque reflector plate 6, and the adjusting means 11 for the opaque mirror 7 provide means for making a correction for any curvature in these plates due to sag or other reasons. Since the lower surfaces of the transparent containers are utilized for passing light rather than reflecting the light, the degree of "flatness" of these surfaces does not have to be as great as the flatness required for the opaque and semi-transparent reflecting surfaces.

In Fig. 4 the lower opaque reflecting surface 7, as shown in Fig. 1, is replaced by a liquid having an opaque liquid reflecting surface. Since the other reflecting surfaces are similar to those shown in Fig. 1 the same reference numerals are used, with the exception that they are primed. A concentrated light source is indicated at 36, the light passing through the light aperture 37 and lens means, produces a collimated light beam 1'. A liquid receptacle 2' is disposed in the path of the collimated beam 1' and is provided with a transparent plate bottom 3' disposed horizontally. The receptacle 2' contains a transparent liquid 4' having a partial transparent upper reflecting surface 5' for splitting the collimated beam 1' into two diverging collimated partial light beams indicated at 1a' and 1b' extending in the same vertical plane, the lower beam 1b' traversing the testing medium in the testing chamber 16'. Interposed in the test beam 1b' is a liquid receptacle 39 containing a liquid 40 having an opaque liquid reflecting surface 41 for reflecting the test beam 1b' in the same manner as the test beam 1b in Fig. 1 is reflected by the deformable mirror 7. The upper partial beam 1a' passes through the transparent bottom 34' of a container 33' having a compensating or refracting liquid 35' therein and strikes the opaque reflecting surface 6' of a deformable and adjustable opaque mirror which is carried in a frame 8' and pivoted at 9' having surface contour adjusting means 10', the adjusting means 10' permitting the adjustment of the flat reflecting surface in the manner indicated in connection with the disclosure shown in Fig. 1. The two partial beams 1a' and 1b' are reflected respectively by the opaque surfaces 6' and 41 in converging directions in the vertical plane toward each other to form the combined interference light beam 26'. A liquid receptacle 12' having a transparent bottom 13' is disposed at the point of intersection of the beams 1a' and 1b' contains a transparent liquid 14' having a partial transparent liquid reflecting surface 15' and comprises means for recombining the two partial beams to form the interference beam 26'. A wind tunnel section 16' is preferably interposed in the reflected portion 1d' of the lower beam, also a liquid receptacle 19' having a transparent bottom 20' and containing a transparent liquid 21' having partial transparent liquid reflecting surface 22' is placed in the beam 1d' after it has passed the wind tunnel section for splitting the partial beam 1b' to form the Schlieren beam 1e'. A liquid container 23' similar to the container 23 in Fig. 1, is interposed in the Schlieren beam 1e' and contains a liquid 24' having an opaque liquid reflecting surface 25' for reflecting the Schlieren beam parallel to the combined interference beam through conventional lens means 30' to converge the Schlieren beam 1e' through the focal point onto an image screen 29' with a Schlieren knife edge 31' touching the beam at the focal point just mentioned to produce a darkened light field and the Schlieren image of the object 17 located in the test chamber 16'. If desired a suitable lens system 41 may be interposed in the interference beam 26' so as to produce the interference fringe image on the screen 28' in the image plane of the lens 41.

Figure 5:
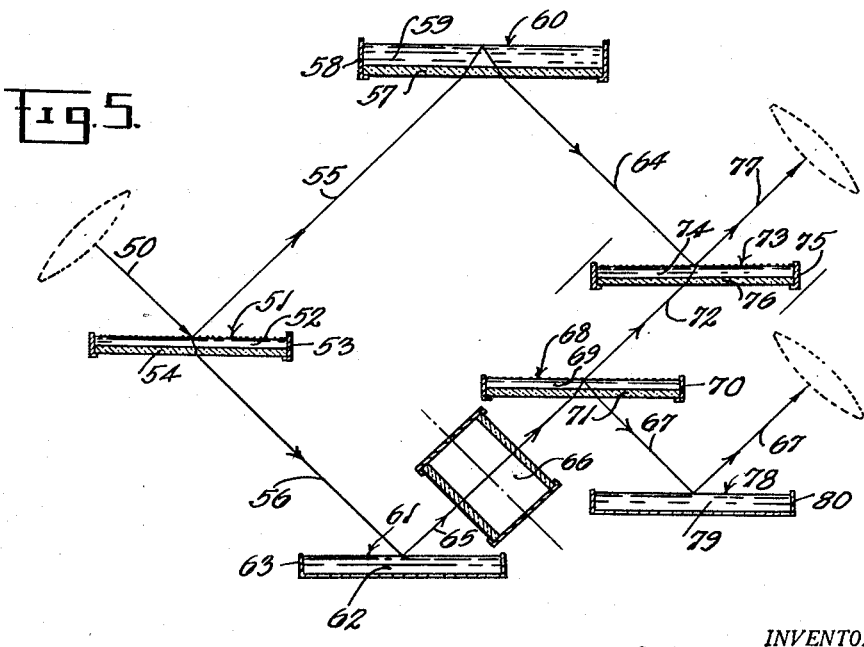
Fig. 5 is a similar vertical sectional view diagrammatically disclosing a four plate and Schlieren interferometer system in which all of the reflecting surfaces are liquid reflecting surfaces.

Referring to the diagrammatic showing in Fig. 5 all of the reflecting surfaces utilized are liquid reflecting surfaces and therefore all of the reflecting surfaces can be large and elongated and will be inherently flat and parallel to each other. One of the containers is preferably adjustable either vertically or in the plane of one of the two converging partial light beams so as to bring the two wave lengths of the beams into phase. In this figure of the drawing the collimated partial beam 50 inclines downwardly from either a single light source, or a plurality of side-by-side light sources as shown in Figs. 6 to 10 and strikes the upper partial transparent liquid reflecting surface 51 of the transparent liquid 52 which is contained in a receptacle 53 having a transparent supporting bottom 54, thus splitting the collimated beam 50 to two diverging collimated partial light beams indicated at 55 and 56 extending in the same vertical plane.

The diverging collimated partial light beams 55 and 56 each have opaque liquid reflecting means disposed in their paths. The upwardly reflected beam 55 passes through the transparent bottom 57 of a liquid container 58 having a transparent liquid 59 therein having an upper opaque reflecting medium surface 60 supported by the liquid. The lower diverging beam 56 strikes the opaque liquid reflecting surface 61 of the liquid 62 contained in a liquid receptacle 63. The opaque liquid reflecting surfaces 60 and 61 reflect the diverging partial beams 55 and 56 toward each other as indicated at 64 and 65. The reflected test beam 65 passes through the test chamber 66 and is split to form the Schlieren beam 67 by the semi-transparent liquid reflecting surface 68 of a transparent liquid 69 carried in a container 70 having a transparent bottom 71. The testing medium being located in the test chamber 66, between the transparent side walls thereof. The Schlieren beam 67 has an opaque liquid reflecting surface 78 interposed in its path forming the upper surface of a liquid 79 supported within the receptacle 80. The opaque liquid reflecting surface 78 reflects the Schlieren beam 67 in parallel relation to the interference beam 77 and conventional lens means such as indicated diagrammatically at 30' in Fig. 4 may be interposed in the path of the Schlieren beam to converge the same through a focal point onto a suitable image screen. A Schlieren knife edge or stop member may be arranged to engage the converging Schlieren beam 67 at the focal point, providing the darkened light field for producing the Schlieren image.

Referring to Figs. 6 to 10, a row of parabolic reflectors of substantially rectangular outline is indicated by the reference numerals 81. The contour of these parabolic reflectors each constitute a rectangular portion of a parabolic reflecting surface which is located at one side of the axis 82 of the whole parabola 83 so that a light source may be interposed at each of the focal points 84 of the respective reflectors 81 to produce a plurality of juxtaposed parallel beams of collimated light, projected by the respective side-by-side reflectors to form a wide collimated beam 85 for use as a wide beam of light for the interferometer apparatus. Each wide beam or multiple beam will be projected downwardly onto the first beam splitting liquid reflector surface 5, shown in Fig. 2 of the drawings.

A somewhat similarly formed group of partial parabolic reflectors 86 is interposed in the exit portion of the wide interference light beam, shown more particularly in Figs. 9 and 10. These parabolic reflectors, like the reflectors 81 have their axes 87 offset so as to pass outside of the confines of the elongated rectangular reflector portions and the reflectors may be disposed in the path of the interference beam, such as shown at 26 in Fig. 1, or in the path of the interference beam 85 in Fig. 10, so as to reflect the same through suitable focal points or lens means onto an image screen for observing, or recording, the light wave interference phenomena.

As shown in Fig. 9 the length of the juxtaposed rectangular parabolic reflector portions 86 is greater than the length of the parabolic reflectors 81 so that each longer reflector may be disposed in the path of a plurality of the collimated beams 85 which are reflected by the respective shorter reflectors 81. In this way a plurality of light sources may be utilized, disposed at the respective focal points 84 and thus materially increase the amount of illumination in the interference beams forming the wide beam which strikes the longer rectangular reflectors 86, thus increasing the efficiency of the apparatus. In employing a plurality of liquid reflecting surfaces in conjunction with a wide beam formed by a plurality of side-by-side rectangular reflectors, each having a large aperture, it is possible to produce an interferometer apparatus for covering large, and particularly long test chambers such as elongated wind tunnel sections and obtain intense illumination. Since the reflecting surfaces are all liquids they are inherently level and parallel, thus providing a feature of self-alignment. The adjustment of one of the liquid containers to equalize the linear distance of the two split beams is a comparatively coarse adjustment since the liquid reflecting surface is always level and parallel with the other reflecting surfaces. In the transparent liquids a partial coating of a very fine metallic powder or a film of suitable liquid may be used which is deposited onto the surface of the transparent liquid, the amount of this powder or reflecting medium determining the proportion of the light beams striking the liquid surface that will respectively pass through and the proportion of the beam that will be reflected. In the opaque liquid reflectors used the amount of the reflecting surface powder may be increased to form a perfect opaque reflector, at the upper surface, facing upwardly, or facing downwardly, in which last event the container would have a transparent bottom and contain a transparent liquid. When the upper liquid reflecting surface faces upwardly and is opaque the container and the liquid may also be opaque since the light beam strikes this latter surface from above and is fully reflected. This liquid may be mercury. If the container is wide enough the usable part of the liquid will be perfectly flat and level. The lower or supporting surfaces for the transparent bottom containers may be fairly accurately ground and polished glass plates having as little curvature, due to the weight of the plate and the liquid thereon as possible.

It is of course necessary, in an interferometer device, using liquid reflecting surfaces to provide as firm and solid a support for the liquid containers as possible so that vibration cannot disturb the liquid reflecting surfaces.

In the liquid compensator it is only necessary to select any suitable liquid having a desirable light refracting index and adjust the quantity of the liquid in the compensator receptacle so as to bring the wave length of the wide test partial beam passing through the testing medium into phase with the other wide partial beam not traversing the test medium. An interference fringe image can then be observed on the screen in the wide recombined main beam, and a Schlieren image can be observed on the image screen in the reflected Schlieren beam.

Having thus described our invention, what we claim as new and desire to secure by Letters Patent is:

1. In an optical system for the investigation of light density fields of a test medium comprising means for producing an inclined input collimated light beam; a first partially transparent liquid reflector having its reflecting surface supported to seek a level horizontally across the input light beam for splitting the collimated light beam into an upwardly inclined reflected partial pencil of collimated light and a second relatively diverging downwardly inclined partial pencil of collimated light passing through the liquid reflector; a pair of optically flat reflectors, one disposed across each of the aforesaid light pencils in a horizontal position for reflecting said light pencils toward each other, a second partially transparent liquid reflector supported to seek a level horizontally in both of the partial light pencils at the point of intersection thereof to recombine the partial light pencils by reflecting one of the partial light pencils upwardly in an inclined direction in a vertical plane, and passing the other partial light pencil upwardly therethrough in the same inclined direction; a test chamber for receiving a testing medium having transparent side walls disposed in one of the aforesaid collimated partial light pencils perpendicular to the pencil and located between the said first partially transparent liquid reflector and said second partially transparent liquid reflector; means in the path of the other partial light pencil to compensate for variations in phase in the two partial light pencils caused by the passage of one partial light pencil through the test chamber and the nonpassage of the other partial light pencil through the test chamber; one of the said horizontal partially transparent liquid reflectors being shiftable transversely to the plane of its reflecting surface for adjusting the relative linear distance of the two partial light pencils between the said partially transparent liquid reflectors; lens means located in the path of the recombined partial light pencils for producing a light image of the recombined partial light pencils.

2. Apparatus as claimed in claim 1 wherein the said partially transparent liquid reflectors are disposed horizontally in horizontally spaced relations at the opposite corners of a vertical parallelogram in which the axis of the inclined collimated input light beam is coincident with one side of the parallelogram with one corner of the parallelogram disposed at the reflecting surface of the first mentioned partially transparent liquid reflector, the said second partially transparent liquid reflector being disposed in horizontally spaced relation to the first partially transparent liquid reflector at the opposite corner of the parallelogram, and one of the said opaque flat reflectors is disposed horizontally at each of the remaining opposite corners of the parallelogram.

3. Apparatus as claimed in claim 2 in which all of said reflectors comprise liquid supporting receptacles disposed substantially horizontally and containing a liquid therein having a light reflecting surface seeking its level horizontally whereby all of the reflecting surfaces are free to seek true flat horizontal planes.

4. Apparatus as claimed in claim 3 in which at least three of the liquid receptacles each include a transparent lower liquid reflector supporting surface to permit passage of the inclined light beams therethrough and each of the three receptacles contain a transparent liquid having an upper light reflecting surface.

5. In an optical system for the investigation of light density fields of a test medium by the wave length interference method; lens means for collimating light from a light source into an inclined bundle of parallel light rays extending in a vertical plane; a first liquid receptacle having a transparent substantially horizontal bottom therein fixed in the path of the parallel light rays, and adapted to receive a transparent liquid therein having a partially transparent upper reflecting surface disposed in the path of the parallel light rays for splitting the parallel light rays into two partial light pencils of collimated light diverging from each other in the said vertical plane, one partial light pencil passing through the receptacle, liquid and its reflecting surface, and the other partial light pencil being reflected by the reflecting surface of the reflecting liquid in the aforesaid vertical plane, a pair of optical flat reflectors disposed in vertically spaced parallel relation to the partially transparent reflecting surface of the liquid, one above and the other below; each reflector of said pair having a horizontal reflecting surface disposed in the path of one of the diverging partial light pencils for reflecting the two partial light pencils toward each other in the said vertical plane; at least one reflector of said pair comprising a substantially horizontal liquid holding receptacle adapted to receive a liquid therein having an opaque upper reflecting surface; means for recombining said partial light pencils at their point of intersection comprising a second horizontally disposed receptacle having a transparent bottom therein, and adapted to contain a transparent liquid having a partially transparent reflecting surface located at the intersection of the partial light pencils for reflecting one of the partial light pencils in the vertical plane and passing the other light pencil therethrough in combined collimated relation with the other last mentioned reflected partial light pencil, a testing chamber disposed in the path of one of the partial light pencils, having spaced parallel transparent side walls and adapted to receive a test medium therebetween; a transparent receptacle disposed in the other partial light pencil having a transparent bottom therein and adapted to contain a predetermined quantity of transparent liquid therein for the passage of said other partial light pencil therethrough, to compensate for the difference in phase between the two combined partial light pencils incident to the passage of one of the partial light pencils through the testing chamber and the passage of the other partial light pencil exteriorly of the walls of the test chamber; an additional liquid container having a transparent bottom, located horizontally in the path of the partial light pencil passing through the testing chamber, and located between said testing chamber and the recombining reflecting surface and adapted to contain, a transparent liquid having a partially transparent liquid reflecting surface for reflecting a portion of the partial light pencil passing through the testing chamber, out of that light pencil in the vertical plane, and another liquid container disposed in the last reflected path of the last mentioned partial light pencil adapted to contain a quantity of liquid having an opaque light reflecting surface for reflecting the last mentioned reflected partial light pencil separately in an adjacent path parallel to the recombined partial light pencils to form a Schlieren interference light beam.

6. Apparatus as claimed in claim 5 including lens means disposed in the path of the recombined partial light pencil, and in the adjacent reflected partial light pencil for converging the recombined light pencils and the parallel adjacent light pencil through focal points to form a pair of parallel juxtaposed light images at the image plane of the lens means, whereby when a Schlieren knife edge is positioned to engage the said adjacent partial light pencil at the focal point of the lens means therein produces a Schlieren image and an interference image in said image plane.

7. In an optical system for the investigation of light density field of a test medium by the wave length interference method, means for producing an inclined collimated light beam; a first partially transparent reflector comprising a transparent liquid having a partially transparent upper reflecting surface adapted to seek its own level and disposed in the path of the inclined collimated light beam for splitting said collimated light beam into a pair of diverging partial light pencils extending in the same vertical plane; a fixed supporting receptacle for said liquid having a transparent bottom; means for recombining the light pencils comprising a pair of horizontal opaque optically flat reflectors, one disposed in the path of each of the diverging partial light pencils for reflecting each of the diverging partial light pencils obliquely toward each other in the aforesaid vertical plane, a second transparent liquid having a partially transparent upper reflecting surface adapted to seek its level in a horizontal plane passing through the point of intersection of the partial light pencils after reflection thereof by the pair of horizontal opaque optically flat reflectors, a second supporting receptacle having a transparent bottom for supporting the last mentioned transparent liquid; at least one of the aforesaid pair of horizontal opaque optically flat reflectors comprising a liquid having an opaque reflecting surface disposed in the path of one of the partial light pencils and a liquid receptacle for retaining that liquid therein, said partially transparent reflecting surface of said second transparent liquid passing a portion of one of the partial light pencils obliquely therethrough in said vertical plane and reflecting a portion of the other partial light pencil obliquely therefrom in said vertical plane in recombined relation; a testing chamber having transparent side walls disposed in the path of one of the partial light pencils intermediate the said second partially transparent liquid reflecting surface and the reflecting surface of the horizontal opaque optical flat reflector of said pair which is located in that partial light pencil and adapted to receive a testing medium; wave length phase compensating means disposed in the path of the other partial light pencil for the oblique passage of that partial light pencil therethrough, located between the said first and second transparent liquids, said wave length phase compensating means comprising a light refracting transparent liqiud having a predetermined depth for the oblique passage of that partial light pencil therethrough to compensate for relative wave length phase difference between the two partial light pencils caused by the passage of the other partial light pencil through the walls of the test chamber; and a liquid receptacle having a transparent bottom for supporting the refracting liquid in the path of the partial light pencil which does not traverse the testing chamber and testing medium.

8. Apparatus as claimed in claim 7, including an additional transparent liquid having a partially transparent reflecting surface adapted to seek its level horizontally in the path of the partial light pencil passing through the testing chamber, and located between the testing chamber and the partially transparent reflecting surface of the second transparent liquid, for reflecting a portion of that partial light pencil obliquely out of that light pencil, in the said vertical plane, transparent liquid container means for supporting said additional transparent liquid in last mentioned partial light pencil; and another reflecting liquid having an opaque reflecting surface adapted to seek its level horizontally below the partially transparent reflecting surface of said additional transparent liquid, for reflecting the portion of the partial light pencil which is reflected by the partially transparent reflecting surface of the additional transparent liquid, in an adjacent parallel relation to the partial light pencil passing through the last mentioned partially transparent reflecting surface.

9. In an optical system for the investigation and analysis of the light density fields of a test medium by the light wave interference method; lens means for collimating light from a light source into an inclined beam of parallel light rays; a first liquid receptacle having a transparent bottom disposed substantially horizontal in the path of said inclined light beam; a transparent liquid in said first receptacle having a partially transparent upper light reflecting surface located in the path of said inclined light beam adapted to seek its level horizontally for splitting said inclined collimated light beam into two inclined collimated partial light beams, one partial light beam being reflected by the light reflecting surface of the liquid in a diverging direction in a vertical plane relative to the other partial light beam, the said other partial light beam passing through the light reflecting surface, the liquid and the bottom of the receptacle in the same vertical plane; a second receptacle located in a horizontal plane above said first receptacle, a transparent bottom in said second receptacle disposed in the path of the aforesaid one of the diverging light beams, a transparent liquid in said second receptacle, an opaque light reflecting medium supported on the upper surface of the last mentioned liquid for reflecting that light beam downwardly through the liquid in an inclined direction in said vertical plane; a third receptacle located in a horizontal plane below said first receptacle; a liquid therein having an upper light reflecting surface adapted to seek its level horizontally, said third receptacle being disposed to position the reflecting surface of the liquid therein in the path of the said other partial light beam to reflect the same in said vertical plane toward the other reflected partial light beam to converge the two partial beams; a partially transparent reflector located horizontally in the path of both of the partial light pencils comprising a horizontally disposed liquid receptacle having a transparent bottom and a transparent liquid contained in the last mentioned receptacle having an upper partially transparent reflecting surface adapted to seek its level in the path of both of the partial light beams at the point of intersection thereof for recombining the two partial light beams to form an interference light beam; lens means disposed in the path of the recombined means for projecting said recombined partial light beams through a focal point to an image plane; a testing chamber having transparent opposite side walls disposed in the path of one of the collimated partial light beams for the passage of that partial light beam therethrough, adapted to contain a testing medium; and compensating means in the path of the other partial light beam for adjusting the relative optical length of the two partial light beams.

10. In an optical system for the investigation of light density fields of a test medium by the light wave interference method; lens means for collimating light from a light source into an inclined collimated light beam; a first transparent liquid receptacle horizontally interposed in said inclined collimated light beam; a transparent liquid therein adapted to seek its level, a partially transparent reflecting medium supported on the surface of said liquid having a reflecting surface for splitting said collimated light into two diverging collimated partial light beams, one beam passing through the liquid, reflecting medium, and the receptacle, and the other beam being reflected by the said reflecting surface in the same vertical plane; a second transparent receptacle disposed in the path of the reflected partial light beam; a transparent liquid therein; an opaque reflecting medium having a light reflecting surface supported on the surface of the last mentioned liquid for reflecting said reflected light beam away from that reflecting surface in the same vertical plane; a third liquid receptacle disposed horizontally in the path of the partial light beam which passes through the first liquid receptacle and the transparent liquid and partially transparent reflecting medium contained thereon; a liquid contained in the third liquid receptacle adapted to seek its level horizontally; an opaque reflecting medium supported on the surface of the last mentioned liquid having a light reflecting surface, said second and third receptacles being disposed in vertically spaced relation to the first receptacle, and in vertically spaced relation to each other in the same vertical plane to dispose the reflecting surfaces of the liquid supported opaque reflecting mediums to reflect the collimated partial light beams toward and across each other in intersecting relation, the light reflecting surfaces of said opaque light reflecting mediums being positioned relative the reflecting surface of the partially transparent reflecting medium in the first receptacle being such that the linear distances of the said two partial light beams along their axes to their point of intersection are substantially equal; a fourth liquid receptacle disposed horizontally in the path of both partial light beams, a transparent bottom therefor; a transparent liquid therein adapted to seek its level horizontally a partially transparent reflecting medium supported on the last mentioned transparent liquid, positioned to locate the reflecting surface of the liquid supported partially transparent reflecting medium substantially at the point of intersection of the two partial light beams to recombine the partial light beams to form an interference beam; said fourth receptacle being adjustable in the direction of one of the reflected partial light beams for adjusting the relative optical distance of the two partial light beams from the partially transparent reflecting surface on the liquid in said first receptacle to the reflecting surface on the liquid in said fourth receptacle; a transparent testing chamber disposed in the path of one of the partial light pencils for receiving a testing medium; compensating means in the other partial light pencil to compensate for change in optical distance of the testing chamber traversing partial beam due to its passage through the testing chamber, comprising a liquid receptacle, a transparent bottom therein for the passage of the last mentioned partial light beam therethrough; a transparent liquid in said last receptacle for passage of the last mentioned partial light beam therethrough, whereby the depth of said last mentioned liquid, including the thickness of the transparent bottom of the last mentioned receptacle, compensates for the passage of the testing chamber traversing partial light beams through the transparent walls of the test chamber, and lens means disposed in the recombined partial light beams, for producing a visual picture of the light wave interference between the partial light beams when a test medium is interposed in the testing chamber.

THEODOR W. ZOBEL.
FERDINAND MIRUS.

References Cited in the file of this patent

UNITED STATES PATENTS

| Number | Name | Date |
|---|---|---|
| 1,044,502 | Crehore et al. | Nov. 19, 1912 |
| 1,598,106 | Schoonmaker | Aug. 31, 1926 |
| 1,939,088 | Styer | Dec. 12, 1933 |
| 2,015,730 | Rosin et al. | Oct. 1, 1935 |
| 2,256,855 | Zobel | Sept. 23, 1941 |
| 2,460,836 | Lovins | Feb. 8, 1949 |
| 2,541,437 | Prescott | Feb. 13, 1951 |
| 2,555,387 | Zobel | June 5, 1951 |

FOREIGN PATENTS

| Number | Country | Date |
|---|---|---|
| 389,529 | Germany | Feb. 4, 1924 |
| 888,644 | France | Sept. 13, 1943 |